Sept. 16, 1941. E. A. EDDY 2,256,448
AIRCRAFT ENGINE COWLING
Filed Aug. 16, 1940 2 Sheets-Sheet 1
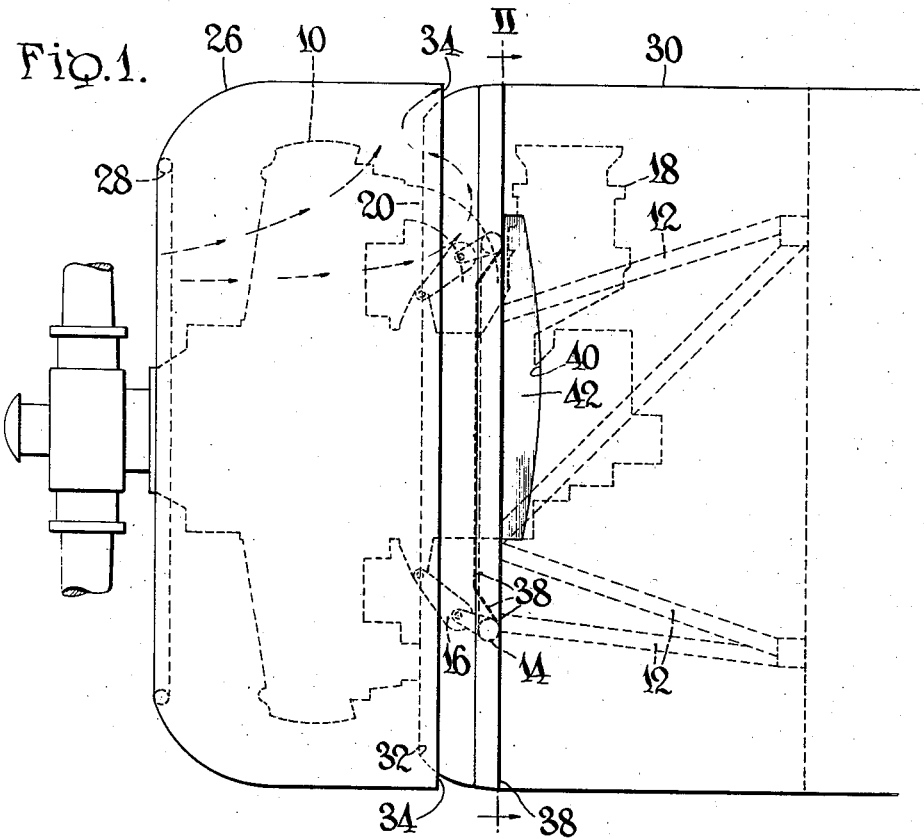
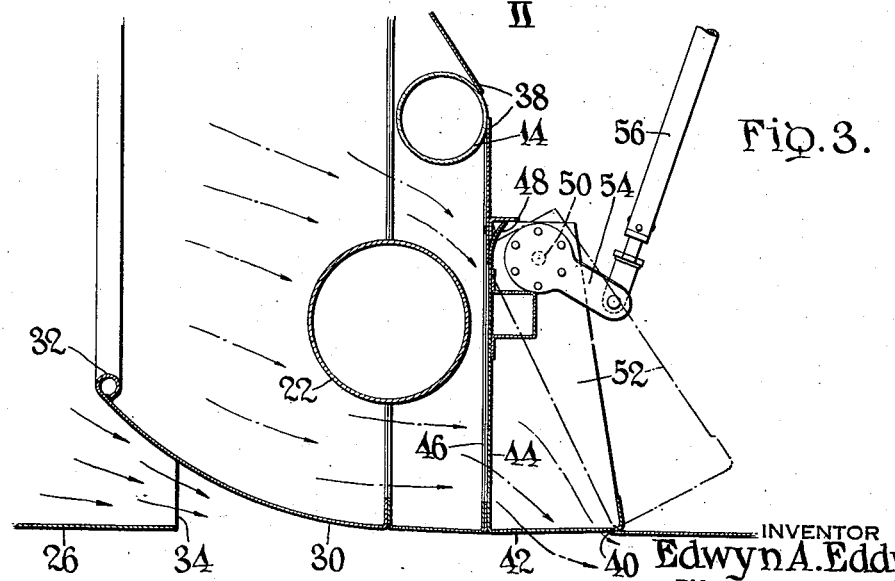
INVENTOR
Edwyn A. Eddy,
BY
Beau, Brooks, Buckley & Beau
ATTORNEYS

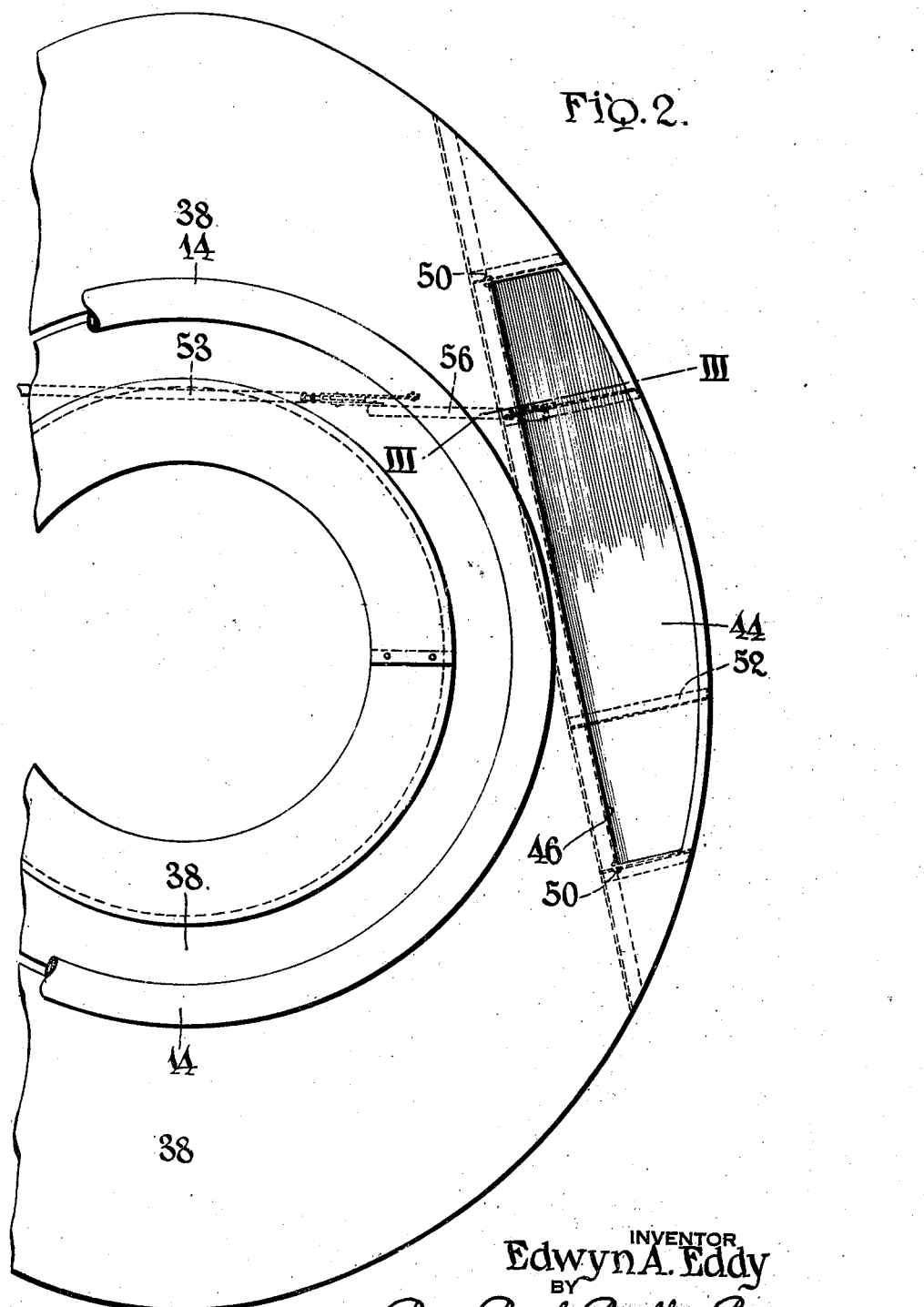

Patented Sept. 16, 1941

2,256,448

UNITED STATES PATENT OFFICE 2,256,448

AIRCRAFT ENGINE COWLING

Edwyn A. Eddy, Stewart Manor, N. Y., assignor to Brewster Aeronautical Corporation, Long Island City, N. Y.

Application August 16, 1940, Serial No. 352,887

7 Claims. (Cl. 123—171)

This invention relates to control of cooling airflow over aircraft engine parts, and more particularly comprises improvements in aircraft engine cowling devices. The invention is particularly applicable to cowling for aircraft engines of the radial cylinder type wherein an axial air intake opening is provided in the cowling ahead of the engine.

One of the objects of the invention is to provide an improved form of adjusted airflows at different ratios with respect to different parts of an aircraft engine to suit different operating conditions, in an improved manner. Another object of the invention is to provide an engine cowling having airflow adjusting control devices of an improved form. Another object of the invention is to provide a device of the character described having improved airflow adjustment control devices which are at all times disposed interiorly of the outer contour of the cowling structure, whereby the control devices produce minimum interference with the aerodynamic performance of the cowling and are free from possible interference by external influences. Other objects and advantages of the invention will appear in the specification.

In the drawings:

Fig. 1 is a fragmentary side elevation of an airplane engine fuselage embodying a cowling structure of the invention;

Fig. 2 is a fragmentary vertical section, on an enlarged scale, taken substantially along line II—II of Fig. 1; and Fig. 3 is a fragmentary substantially horizontal section, on an enlarged scale, taken substantially along line III—III of Fig. 2.

The invention is illustrated in the drawings in association with an aircraft engine 10 which is of conventional radial cylinder type and mounted upon the aircraft fuselage by means of a system of struts 12 extending forwardly from the aircraft fuselage and carrying at their forward ends the engine mounting ring 14. The engine 10 is mounted upon the mounting ring 14 by means of connecting links 16 disposed at suitable intervals about the engine crank case, in accord with usual engine mounting practice. Behind the engine cylinders the necessary accessories thereto, such as carburetor, generator, starter, oil pump, fuel pump, and the like, are mounted upon the engine crank case as indicated generally by the numeral 18. Engine exhaust gas conduits 20 lead from the engine cylinders into an exhaust manifold 22 which collects the exhaust gases and conveys them to a suitable point of outlet through the cowling structure.

The cowling structure comprises essentially an engine cylinder cowl 26 comprising essentially a shell of annular form mounted upon the engine by suitable brackets (not shown); the shell being so disposed as to substantially embrace the cylinder section of the engine but not to include the exhaust manifold and the engine accessory parts. The cowl 26 is formed with reduced radius at its forward end for streamlining purposes, and has a central air inlet opening 28. At its rear end the cowl 26 is completely open, and an accessory cowl 30 of a form generally resembling that of the cowl 26 is arranged in communication therewith. The forward end of the cowl 30 is rounded to a reduced radius and provided thereat with a central opening 32. The reduced front end portion of the cowl 30 is nested within the rear end of the cowl 26 in partially telescoped relation, and thus an annular air discharging opening 34 of fixed width is provided at the junction of the cowl members.

The cowl 30 is arranged to enclose the accessory elements of the engine and the engine exhaust manifold 22. A partition 38 is arranged to extend transversely of the interior of the cowl 30 and to close the space between the engine crank case and the cowl shell in the region between the engine exhaust manifold and the accessory elements 18; thus serving as a shroud for the accessory elements 18 and preventing transmission of heated air from the engine cylinder compartment into the accessory compartment of the cowling structure.

It will be noted that the air outlet opening 34 is in line with the engine cylinders and the air inlet opening 28 of the engine cowl, and that forward movement of the aircraft will cause air to be forced through the opening 28 into the cowl 26 and over the engine cylinders and thence through the discharge opening 34 as illustrated diagrammatically in Fig. 1. The engine exhaust manifold 22 is simultaneously cooled by airstreams deflected by the partition 38 as also illustrated in Fig. 1. The outlet 34 and the inlet opening 28 and the form and dimensional characteristics of the cowling structure are so relatively proportioned and arranged as to provide efficient cooling of the engine under normal power developing conditions through means of the air circulation just described. However, under excessive load conditions, as during take off or other climbing maneuvers the modern aircraft engine is called upon to deliver a greatly increased power output, compared to that delivered under normal or cruising conditions. When developing such extra power the engine generates heat at an increased rate, and the invention contemplates the provision of secondary air outlet means which may be brought into play under increased power output conditions to provide additional air flow through the cowl structure in association with those of the engine parts that require treatment by air streams moving at increased rates.

It is, of course, well known to provide adjustable flap devices at the trailing edge portions of engine cowls whereby the air outlet openings may be enlarged or contracted in accord with temperature conditions in the engine compartment. However, the present invention provides an improved method of circulating the cooling air relative to different parts of the engine, as will be now described. The secondary airflow control device of the invention is illustrated herein as comprising a pair of outlet ports 40 through the shell of the accessory cowl 30 at opposite sides thereof, and airflow control flaps 42 for regulating the flow of air through the ports 40. The ports 40 are in line with the engine exhaust manifold 22 and the air inlet opening 32 at the forward end of the cowl 30. Consequently, upon opening of the flaps 42 a new system of air circulation with respect to the engine exhaust manifold will be instituted; and whereas the manifold 32 was previously cooled by air streams that were substantially reversed in direction at the partition 38 prior to discharge through the outlet 34 (Fig. 1), and relatively slow moving around the exhaust manifold, the manifold 22 will now be cooled by more rapidly moving air streams of increased size which pass directly over the manifold on their way toward the outlet ports 40 (Fig. 2). Consequently, the invention may be applied to provide increased rate of airflow through the cowling structure under increased power output conditions, but at modified ratios of air stream volumes and rates of flow with respect to the cylinders and to the exhaust manifold. Consequently, for example, the temperature of the engine exhaust system may be regulated as required without sacrificing optimum performance temperatures in the region of the engine cylinder parts, as for example by overcooling the latter, and hence improved engine performance is provided under various power conditions.

As illustrated in Figs. 2 and 3, each of the air outlet control flaps 40 are provided integrally with a plate member 44 and combines therewith to form a structure of substantially right-angle sectional form. The plates 44 are adapted to conform to the partition member 38 and to function as closures for corresponding air channels 46 in the partition member 38. The plates 44 are curved as at 48 at their inner ends, and are pivotally mounted at 50 concentrically of the curve 48 upon the partition 38. Transverse ribs 52 are provided to connect the plates 44 and the flaps 42 so as to provide rigid structures pivotable about their respective hinges, as from the solid line position shown in Fig. 2 to the broken line position thereof. Actuating means in the form of a tie rod 53 connecting at opposite ends with suitable crank arms 54 through push pull rods 56 are illustrated in conjunction with the device for adjustment of the latter to various air control positions. It is contemplated that the tie rod 53 may be actuated by any suitable means, such as manually by the pilot or automatically through means of any suitable temperature-responsive devices such as are presently available for other automatic control purposes.

Thus, the plate portions 44 normally function as closures for the openings 46 in the partition 38 and cooperate with the adjacent marginal edge portions of the partition 38 to prevent movement of heated air from the engine cylinder compartment into the accessory compartment. Similarly, upon actuation of the flaps 42 to their open position, the plates 44 cooperate with the flaps 42 and the partition 38 to effectively bar movement of heated air into the accessory compartment. By reason of the structural form and arrangement of the secondary airflow outlet control devices, all of the structural parts thereof are at all times disposed within the outer contour of the cowling structure, and hence protrudance of parts into the surrounding air stream is avoided and minimum interference with the aerodynamic performance of the cowling is experienced. Suitable gasket devices may be employed in connection with the coacting portions of the secondary airflow control device of the structure, if desired, to provide at all times complete sealing of the parts so as to prevent even minor leakages of gases from the engine cylinder compartment into the engine accessory compartment. The control flaps 42 are curved in plan form at their rear edges, as illustrated in Fig. 1 so as to be adapted to move into and out of flush engagement with the outer contour of the cooling structure without interferences.

The invention contemplates the locating of the secondary airflow control devices hereinabove described at any desired position radially about the shell of the accessory cowl 30 and in accord with the requirements of different engine installations. For example, the drawings herein and the description hereinabove pertain to a form of application of the invention which provides the features of the invention in connection with an engine of the radial cylinder type having its exhaust manifold structure formed generally into a pair of oppositely disposed side arm portions for the collection of exhaust gases from the engine cylinders located generally at the corresponding side portions of the engine. Consequently, a pair of secondary airflow control devices arranged substantially adjacent the major side portions of the exhaust manifold, as illustrated in the drawings, will provide in such case the features and advantages of the invention.

However, it will be understood that the secondary airflow control devices may be varied in dimension and employed in any desired multiples and disposed at any desired position radially of the accessory cowl 30, as may be required to provide the airflow methods of the invention in view of differences in relative arrangement of the engine parts in connection with different engines to be cooled. Consequently, although only one form of the invention has been shown and described in detail, it will be apparent to those skilled in the art that the invention is not so limited but that various changes may be made therein without departing from the spirit of the invention or the scope of the appended claims.

What is claimed is:

1. An engine cooling system for engines in which the cylinders thereof and the exhaust gas manifold thereof are substantially displaced axially of said engine, comprising a cowl embracing the cylinder section of said engine and defining an air entrance opening ahead of the engine, a second cowl substantially in line with the first mentioned cowl and having a reduced end portion nested within the trailing edge portion of said first mentioned cowl so as to define an air outlet opening therebetween, a transverse partition extending interiorly of said second mentioned cowl at a position substantially aft of the forward end thereof, said engine exhaust manifold being located substantially within said second mentioned cowl ahead of said partition and normally cooled by pressure induced reversely flowing air streams discharging through said air outlet opening, and a secondary airflow control device adapted to be brought into play under excess power output conditions and comprising an air outlet port through said second mentioned cowl aft of said exhaust manifold and normally closed by a control member, and means for moving said control member to port-open positions under excess power output conditions.

2. A radial engine cooling system for engines in which the cylinders thereof and the exhaust gas manifold thereof and the accessory elements thereof are substantially displaced axially of said engine, comprising a cowl embracing the cylinder section of said engine and defining an air entrance opening ahead of the engine, a second cowl substantially in line with the first mentioned cowl and having a reduced end portion nested within the trailing edge portion of said first mentioned cowl so as to define an air outlet opening therebetween, a transverse partition extending interiorly of said second mentioned cowl at a position substantially aft of the forward end thereof, said engine exhaust manifold being located substantially within said second mentioned cowl ahead of said partition and normally cooled by pressure induced reversely flowing air streams discharging through said air outlet opening, said engine accessory elements being located within said second mentioned cowl aft of said partition, and a secondary airflow control device adapted to be brought into play under excess power output conditions and comprising an air outlet port through said second mentioned cowl aft of said exhaust manifold and normally closed by a control member, an air transmission port through said partition adjacent said air outlet port and normally closed by a closure member, and means for moving said control member and said closure member to port-open positions under excess power output conditions.

3. A radial engine cooling system for engines in which the cylinders thereof and the exhaust gas manifold thereof and the accessory elements thereof are substantially displaced axially of said engine, comprising a cowl embracing the cylinder section of said engine and defining an air entrance opening ahead of the engine, a second cowl substantially in line with the first mentioned cowl and having a reduced end portion nested within the trailing edge portion of said first mentioned cowl so as to define an air outlet opening therebetween, a transverse partition extending interiorly of said second mentioned cowl at a position substantially aft of the forward end thereof, said engine exhaust manifold being located substantially within said second mentioned cowl ahead of said partition and normally cooled by pressure induced reversely flowing air streams discharging through said air outlet opening, said engine accessory elements being located within said second mentioned cowl aft of said partition, and a secondary airflow control device adapted to be brought into play under excess power output conditions and comprising an air outlet port through said second mentioned cowl aft of said exhaust manifold and normally closed by a control member, an air transmission port through said partition adjacent said air outlet port and normally closed by a closure member, and means for moving said control member and said closure member to port-open positions under excess power output conditions, said control member and said closure member being in the form of an integral unit and mounted upon said partition by pivot means.

4. A radial engine cooling system for engines in which the cylinders thereof and the exhaust gas manifold thereof and the accessory elements thereof are substantially displaced axially of said engine, comprising a cowl embracing the cylinder section of said engine and defining an air entrance opening ahead of the engine, a second cowl substantially in line with the first mentioned cowl and having a reduced end portion nested within the trailing edge portion of said first mentioned cowl so as to define an air outlet opening therebetween, a transverse partition extending interiorly of said second mentioned cowl at a position substantially aft of the forward end thereof, said engine exhaust manifold being located substantially within said second mentioned cowl ahead of said partition and normally cooled by pressure induced reversely flowing air streams discharging through said air outlet opening, said engine accessory elements being located within said second mentioned cowl aft of said partition, and a secondary airflow control device adapted to be brought into play under excess power output conditions and comprising an air outlet port through said second mentioned cowl aft of said exhaust manifold and normally closed by a control member, an air transmission port through said partition adjacent said air outlet port and normally closed by a closure member, and means for moving said control member and said closure member to port-open positions under excess power output conditions, said control member and said closure member being in the form of an integral unit and mounted upon said partition by pivot means, and a sealing plate extending inwardly of said second mentioned cowl adjacent said outlet port and curving concentrically of the line of said pivot and adapted to slidably contact said control-closure member unit in all positions of its adjustment to seal the engine cylinder compartment of said cowling from the accessory element compartment thereof.

5. A cowling for an engine having at the rear thereof an auxiliary device to be air cooled, comprising a front cowling member extending around the engine proper, a rear cowling member extending around the auxiliary device and having its leading edge spaced from the trailing edge of the front cowling member to provide an air outlet between the cowling members for air flowing over the engine, a transverse wall extending across the rear cowling member aft of said auxiliary device and provided with an air exhaust opening, a closure for the opening and means for moving the closure to positions covering or uncovering said opening, the transverse wall functioning when the opening is covered to deflect a portion of the air entering through the front cowling member, causing such air to flow reversely around the auxiliary device and to discharge through said air outlet, and when the opening is uncovered permitting a direct exhaust therethrough of air flowing around said auxiliary device.

6. A cowling for an engine having at the rear thereof an auxiliary device to be cooled, comprising a front cowling member extending around the engine proper and a rear cowling member extending around said auxiliary device and with its leading edge spaced from the trailing edge of the front cowling member to provide an air outlet between the cowling members for air flowing over the engine proper, a wall extending across the rear cowling member aft of said auxiliary device and normally functioning to deflect air flowing over said auxiliary device forwardly for discharge through said outlet, said wall having an opening adjacent said auxiliary device, the rear cowling member having an opening rearwardly of said wall, and a closure member for both of said openings hinged for swinging rearwardly of said wall away from said openings to provide when open for the direct exhaust of air passing over said auxiliary device and a baffle for deflecting air that has passed through the wall opening through the opening in the rear cowling member.

7. A cowling for an engine having a manifold disposed rearwardly of the engine cylinders, comprising a front cowling member extending around the cylinder portion of the engine, a rear cowling member extending around the manifold and having its leading edge spaced from the trailing edge of the front cowling member to provide an air outlet between the cowling members for air flowing over the engine cylinders, the rear portion of the rear cowling member being closed for normally deflecting forwardly a portion of the air entering through the front cowling to cause such portion of air to circulate about said manifold and discharge through said air outlet, the rear cowling member having an air exhaust port therethrough for permitting the direct exhaust of such portion of air passing around the manifold, and a closure plate for said port adjustably mounted interiorly of said rear cowling member and upon an axis disposed chord-wise thereof for pivotal movement about said axis and axially and inwardly of said rear cowling member away from port closing position, said closure plate having a trailing edge portion adapted to move into registry with a marginal edge portion of said rear cowling member adjacent said port during port closing movements of said closure plate, the latter being curvilinear in plan view at the trailing edge portion thereof, and said marginal edge portion of the said rear cowling member being shaped complementary to said plate trailing edge.

EDWYN A. EDDY.